United States Patent
Barbara et al.

(10) Patent No.: US 7,866,604 B2
(45) Date of Patent: Jan. 11, 2011

(54) AIRCRAFT INCLUDING AN AIR CONDITIONING SYSTEM

(75) Inventors: Olivier Barbara, Puylaurens (FR); Damien Prat, Colomiers (FR)

(73) Assignee: Airbus France, Toulouse (FR)

( * ) Notice: Subject to any disclaimer, the term of this patent is extended or adjusted under 35 U.S.C. 154(b) by 444 days.

(21) Appl. No.: 12/042,608

(22) Filed: Mar. 5, 2008

(65) Prior Publication Data

US 2008/0217476 A1    Sep. 11, 2008

(30) Foreign Application Priority Data

Mar. 7, 2007    (FR) .................... 07 01647

(51) Int. Cl.
*B64D 13/00*    (2006.01)
(52) U.S. Cl. ................. 244/118.5; 60/39.511
(58) Field of Classification Search ............. 244/118.5, 244/1 R, 207; 62/402; 60/39.511, 39.83, 60/320
See application file for complete search history.

(56) References Cited

U.S. PATENT DOCUMENTS

| 2,391,838 | A |   | 12/1945 | Kleinhans |             |
|-----------|---|---|---------|-----------|-------------|
| 2,734,356 | A |   | 2/1956  | Kleinhans |             |
| 2,953,078 | A |   | 9/1960  | Best      |             |
| 4,419,926 | A |   | 12/1983 | Cronin    |             |
| 5,125,597 | A | * | 6/1992  | Coffinberry | ........... 244/118.5 |
| 5,137,230 | A | * | 8/1992  | Coffinberry | ........... 244/118.5 |
| 5,442,905 | A | * | 8/1995  | Claeys et al. | ............... 60/785 |
| 5,482,229 | A | * | 1/1996  | Asshauer  | ............. 244/118.5 |
| 5,911,388 | A | * | 6/1999  | Severson et al. | ....... 244/118.5 |
| 6,045,088 | A | * | 4/2000  | Saiz      | ..................... 244/1 R |
| 6,128,896 | A |   | 10/2000 | Saiz      |             |
| 7,607,318 | B2 | * | 10/2009 | Lui et al. | ................. 62/402 |
| 2004/0195447 | A1 | * | 10/2004 | Claeys  | ................ 244/118.5 |

FOREIGN PATENT DOCUMENTS

GB    2 396 208    6/2004

OTHER PUBLICATIONS

Preliminary Search Report dated Aug. 21, 2007

* cited by examiner

*Primary Examiner*—Christopher P Ellis
(74) *Attorney, Agent, or Firm*—Dickinson Wright PLLC

(57) ABSTRACT

An aircraft recovers the energy of conditioned air as it passes from a conditioned zone to outside the aircraft and uses the recovered energy to air condition the aircraft.

3 Claims, 3 Drawing Sheets

AIRCRAFT INCLUDING AN AIR CONDITIONING SYSTEM

FIELD OF THE INVENTION

The present invention relates to aircraft provided with an air conditioning system.

BACKGROUND OF THE RELATED ART

It is known that, on board aircraft, an air conditioning system is provided that feeds the inhabited zones, such as the passenger cabin, the cockpit, and so on, with conditioned air. Such a system takes hot air, and possibly cold air, from the turboshaft engines of the aircraft and converts the air that is taken into conditioned air, distributed in such a zone, then evacuated from the latter to outside the aircraft.

The evacuation to outside the aircraft of the conditioned air is performed with a strong pressure difference, which provokes the creation of a powerful air jet which generates drag for the aircraft.

Furthermore, this pressure difference is representative of an energy that is lost in the evacuation process.

Document U.S. Pat. No. 6,128,896 discloses the general idea of recovering this lost energy and, to this end, addresses the conditioned air evacuated to the turboshaft engines installed on the aircraft.

Moreover, document GB-2 396 208 describes an aircraft including an air conditioning system feeding conditioned air to at least one zone of said aircraft, a zone in which the conditioned air can escape to the outside through an exhaust duct. The aircraft also includes means able to recover, when the aircraft is flying at altitude, the energy of the release of said conditioned air when the latter passes from the conditioned zone to outside the aircraft. The system comprises a switching valve, the sole input of which is positioned in the conditioned zone and of which a first and a second outlets are respectively linked to said exhaust circuit and to said energy recovery means.

SUMMARY OF THE INVENTION

The object of the present invention is to improve the recovery of the energy generated by the release of the conditioning air on its evacuation to outside the aircraft and to propose an advantageous application of the duly recovered energy.

To this end, according to the invention, the aircraft includes:
an air conditioning system feeding conditioned air to at least one zone of said aircraft via distribution means, a zone in which the conditioned air can escape outside said aircraft through an exhaust duct;
means able to recover, when said aircraft is flying at altitude, the energy of the release of said conditioned air when the latter passes from said conditioned zone to outside the aircraft;
a switching valve, the sole inlet of which is positioned in said conditioned zone and of which a first and a second outlets are respectively linked to said exhaust duct and to said energy recovery means, said switching valve being:
in its position linking its inlet to said energy recovery means when said aircraft is in cruising flight phase or in a flight phase close to cruising, and
in its position linking its inlet to said exhaust duct, in all other possible situations of said aircraft,
an auxiliary air conditioning unit partly fed with energy by said energy recovery means and able to take fresh air from outside said aircraft and generate conditioned air from said fresh air; and
switching means making it possible to feed said distribution means:
with conditioned air originating from said auxiliary conditioning unit, when said aircraft is in cruising phase or in a flight phase close to cruising, and
with conditioned air originating from said air conditioning system in all other possible situations of said aircraft.

Thus, said energy recovery means contribute to the air conditioning of said aircraft.

Of course, the recovered energy is deducted from that of the conditioned air jet leaving outside the aircraft, such that said air jet generates a reduced drag.

It will be noted that the energy of the release of the conditioning air is recovered when the pressure difference between said zone and the outside of the aircraft is maximum [in cruising flight phase, the total pressure provided by said air conditioning system in said zones is of the order of 0.75 bar ($0.75 \cdot 10^5$ Pa), whereas the static pressure outside the aircraft is then only of the order of 0.2 to 0.3 bar (from $0.2 \cdot 10^5$ to $0.3 \cdot 10^5$ Pa), that is, two to three times less than the pressure maintained in said zones by the air conditioning system] and in a flight phase (cruising) of long duration. On the other hand, this energy recovery is disabled in the short flight phases for which, furthermore, the pressure difference is less. In such short flight phases, the recovery of energy from the conditioning air would, for these reasons, be complicated, not very cost effective and unstable.

When, in the usual manner, said air conditioning system comprises:
means of taking hot air from at least one turboshaft engine of said aircraft; and
means of converting said duly taken hot air into conditioned air, it is advantageous to provide means making it possible to interrupt the taking of hot air from the turboshaft engine by said hot air taking means when said conditioned air distribution means are fed by said auxiliary unit.

An embodiment variant of the present invention applies to an aircraft also comprising at least one zone that is ventilated, but not pressurized, said ventilated zone being fed with ventilation air by means of taking fresh air from outside said aircraft and being able to let the ventilation air escape outside the aircraft.

In this case, said energy recovery means comprise:
a link between said second outlet of said switching valve and said ventilated zone; and
control means making it possible to interrupt the taking of fresh air by said fresh air taking means.

Thus, said ventilated zone can be fed:
with conditioned air via said link when said aircraft is in cruising phase or in a flight phase close to cruising, the taking of fresh air then being interrupted by said control means; and
with fresh air originating from said taking means, in all other possible situations of said aircraft, said link then being interrupted by said switching valve.

The figures of the appended drawing will clearly show how the invention can be implemented. In these figures, identical references denote similar elements.

BRIEF DESCRIPTION OF THE DRAWINGS

FIG. 1 diagrammatically represents, by a chain-dotted line, the fuselage 1 of an aircraft (not otherwise represented) inside which there is delimited at least one cabin 2, the air of which is conditioned by a system 3. The cabin 2 can represent the passenger cabin, the cockpit, or both.

DETAILED DESCRIPTION OF THE INVENTION

Figure 1:
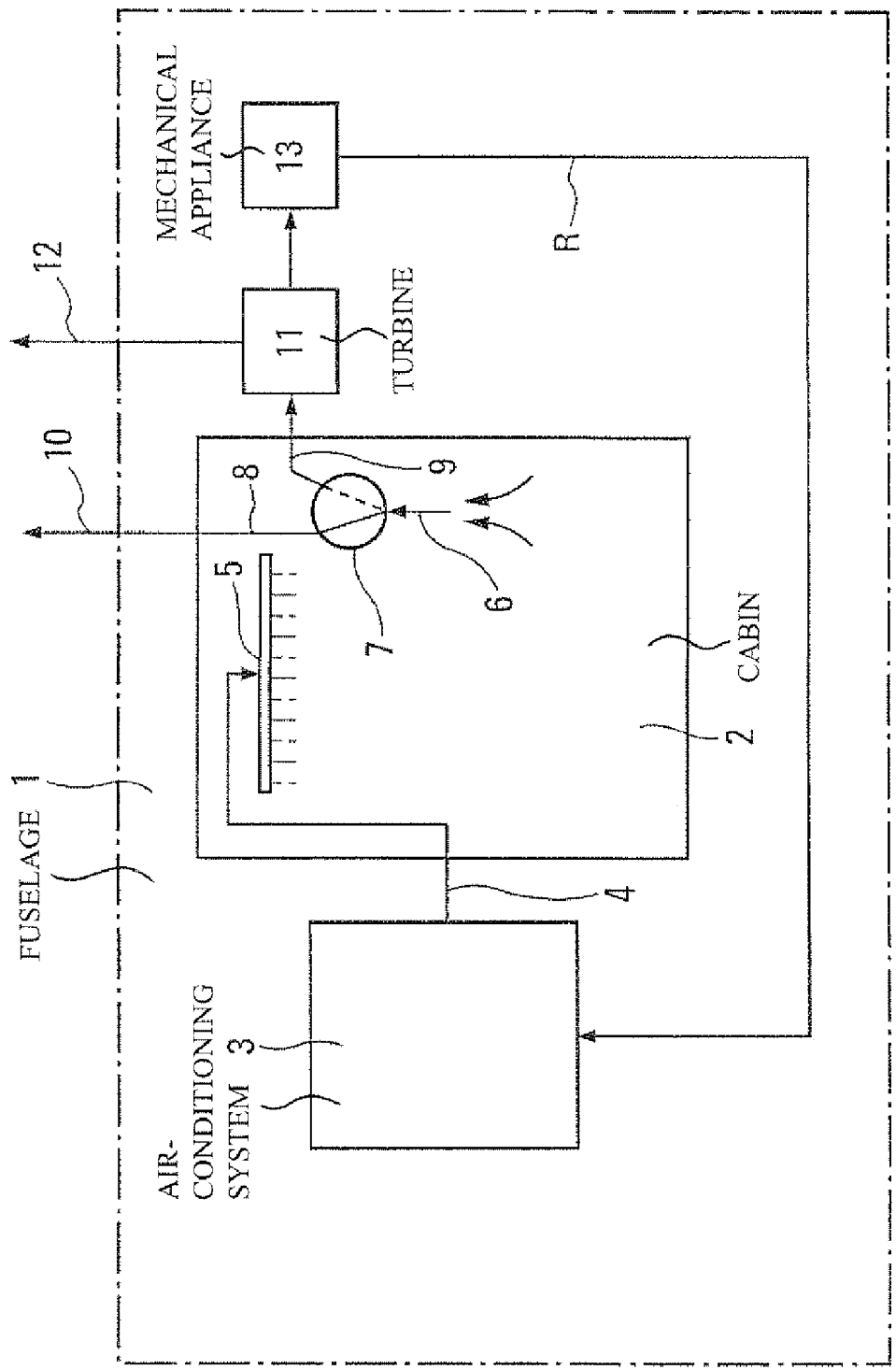
FIG. 1 is a block diagram of an air conditioning device for an aircraft.

The outlet 4 of the air conditioning system 3 is linked to a device 5 distributing said conditioned air inside the cabin 2.

The cabin 2 comprises a system for evacuating conditioned air comprising an inlet 6, a switching valve 7 linked to said inlet 6 and comprising two outlets 8 and 9. The outlet 8 is directly linked to the outside of the fuselage 1 via a duct 10. The outlet 9 is linked to the outside of the fuselage 1 via a turbine 11 and its outlet 12. The turbine 11 is coupled to a current generator or to a mechanical appliance 13.

When the aircraft is in cruising flight mode or in a cruising flight phase, that is, when the pressure difference between the cabin 2 and the outside of the fuselage 1 is great, the valve 7 is in its position represented by broken lines in FIG. 1 linking the inlet 6 to the outlet 9.

Consequently, the turbine 11 is passed through by the conditioned air escaping from the cabin 2 to outside the fuselage and partly recovers the energy from the release of this air. The turbine 11 therefore drives the device 13 rotation-wise.

The energy recovered by the turbine 11 and the device 13 is addressed to the air conditioning system 3, as is symbolized by the line R, so that this recovered energy helps to operate said system 3.

On the other hand, when the aircraft is in any situation other than that of the cruising flight phase or in a flight phase close to cruising, the valve 7 is in its position represented by a solid line in FIG. 1 for which the inlet 6 is linked to the outlet 8. In this case, the turbine 11 is not activated and the conditioned air escapes through the duct 10.

Figure 2:
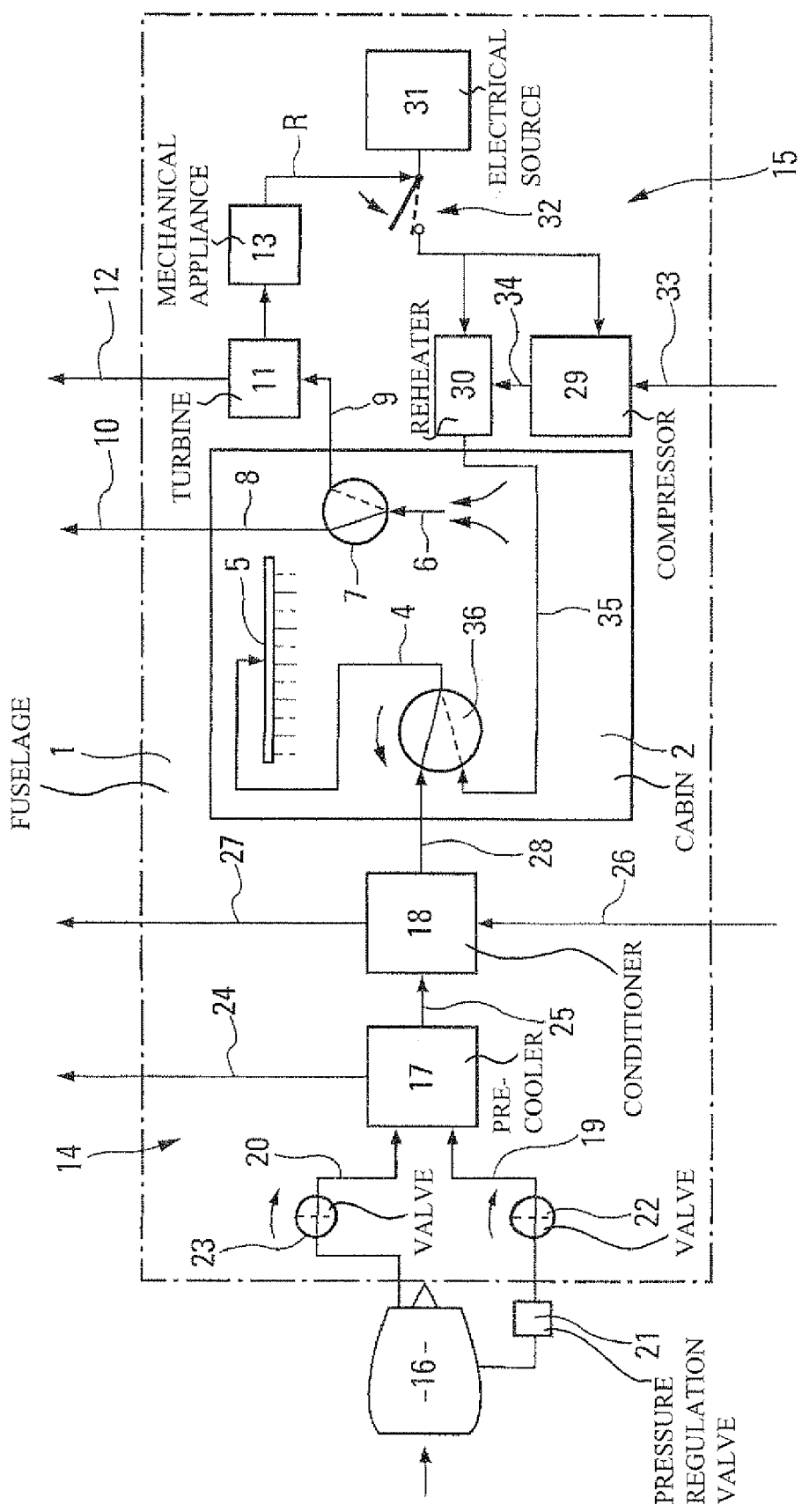
FIG. 2 diagrammatically shows one embodiment of the air conditioning device according to the invention.

The embodiment of FIG. 2 also includes the elements 1 to 13 and R described above, the air conditioning system 3 comprising a main device 14 and an auxiliary device 15.

The main device 14 of the air conditioning system 3 is associated with at least one engine 16 of the aircraft and comprises, in a known manner, a pre-cooler 17 and a conditioner 18. The pre-cooler 17 is able to receive, on the one hand, hot air with raised temperature and pressure via a pipe 19 taking the latter from the hot flow of the turboshaft engine 16 and, on the other hand, cold air via a pipe 20 taking the latter from the cold flow of said turboshaft engine 16. The pipe 19 has mounted on it a pressure regulating valve 21 and a valve 22, whereas a valve 23 is fitted on the pipe 20.

Thus, when the valves 22 and 23 are in the open position, the pre-cooler 17, of the heat-exchanger type, can, from the hot air (the pressure of which is already lowered by the valve 21) and from the cold air that it receives respectively via the pipes 19 and 20, generate a current of reheated cold air which it evacuates to outside the aircraft via a duct 24, and a current of hot air that is precooled and at lowered pressure that it addresses to the conditioner 18 via a duct 25. The conditioner 18, also of the heat-exchanger type, completes the cooling and regulation of the pressure of said precooled hot air current using fresh air taken from outside the aircraft via a duct 26 and evacuates, to outside said aircraft, reheated fresh air via a duct 27. At the outlet 28 of the conditioner 18, temperature and pressure conditioned air can be available to condition the cabin 2.

The auxiliary device 15 of the air conditioning system 3 comprises a compressor 29 and temperature-adjusting means 30 (reheater and/or recooler), which can be powered by an electrical source 31, via a controllable switch 32. The compressor 29 can take air from outside the fuselage 1 via a duct 33, compress the taken air, then address the duly compressed air to the temperature-adjusting means 30 via a duct 34. At the outlet 35 of the reheater 30, it is therefore possible to have air available that is temperature and pressure conditioned by the compressor 29 and the means 30.

The conditioned air distribution device 5 can be fed with conditioned air via the outlet 28 of the conditioner 18 or via the outlet 35 of the reheater 30, according to the position of a switching valve 36, which is inserted between said distribution device 5, on the one hand, and the outlets 28 and 35, on the other hand, and the outlet of which forms the outlet 4 of the system 3.

This air conditioning system operates as follows, given the fact that the appliance 13 is assumed to be an electric generator mounted in parallel on the source 31.

A. When the aircraft is in cruising phase or in a flight phase close to cruising, the valves 7, 22, 23, 36 and the switch 32 are in their position represented by broken lines in the figure. Consequently:

the valves 22 and 23 are closed and no air is taken from the hot and cold flows of the engine 16. At the outlet 28 of the conditioner 18, no conditioned air therefore appears;

the valve 7 connects the inlet 6 with the turbine 11, so that the conditioned air leaving the cabin 2 escapes outside through said turbine 11 and its outlet 12. The turbine 11 therefore drives the generator 13 which produces electrical energy which can be added to that of the source 31 via the line R;

the switch 32 is closed and the auxiliary device 15 is fed with energy by the generator 13 and by the source 31 and is therefore operating, so that conditioned air appears at the outlet 35 of the reheater 30; and the valve 36 connects said outlet 35 with the distribution device 5, so that the cabin 2 is conditioned by the auxiliary device 15.

Thus, in cruising or close to cruising phase, the energy from the release of the conditioned air, recovered by the turbine 11 and the generator 13, is used to partly feed the auxiliary air conditioning device 15.

B. In all the possible situations of the aircraft, other than the flight phase specified in A, the valves 7, 22, 23 and 36 and the switch 32 are in their position represented by a solid line in the figure. Consequently:

the conditioned air escapes directly to outside the aircraft through the duct 10, without driving the turbine 11;

the switch 32 is open and the auxiliary device 15 is not operating, because it is not fed by the generator 13 and by the source 31. At the outlet 35 of the reheater 30, no conditioned air therefore appears;

the valves 22 and 23 are open, so that air is taken from the hot and cold flows of the engine 16 and conditioned air appears at the outlet 28 of the conditioner 18; and the valve 36 connects said outlet 28 with the distribution device 5, so that the cabin 2 is conditioned in the usual way from air taken from the flows of the engine 16.

Although in the above description it has been assumed that the turbine 11 was driving an electric generator 13 and the source 31 was itself electrical, it will easily be understood that the energy feeding the compressor 29 could be of any type other than electrical. For example, the turbine 11 could be directly mechanically geared to said compressor 29 (the generator 13 is then pointless) and the source 31 could be pneumatic, the actions of the turbine 11 and of the source 31 then being combined together at the level of said compressor 29.

Figure 3:
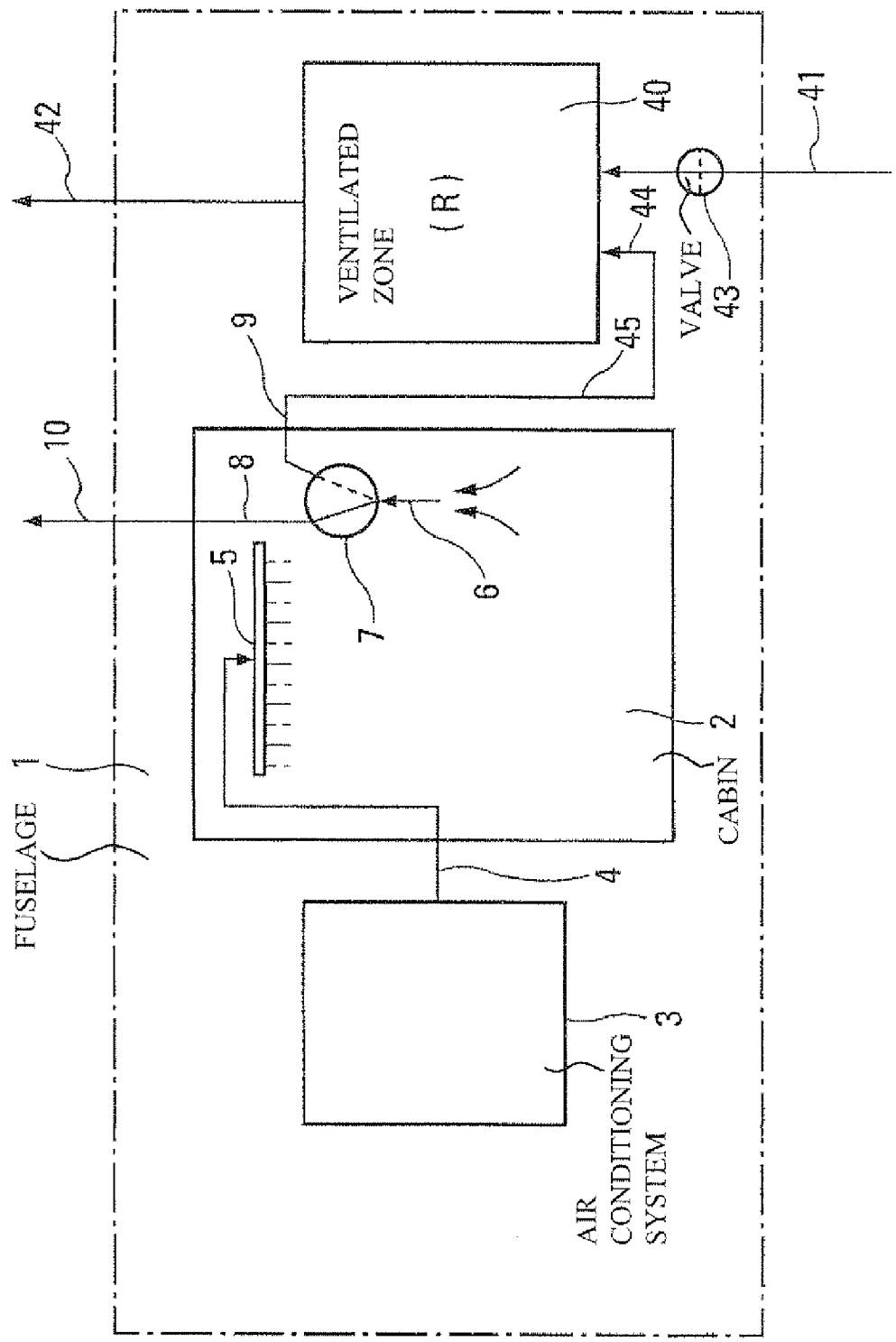
FIG. 3 shows a variant of the device according to the present invention.

The embodiment variant of FIG. 3 again includes the elements 1 to 10 described above. Furthermore, in this figure, a zone 40 of the aircraft is represented, ventilated but not pressurized, such as, for example, the rear tip of said aircraft.

For its ventilation, the zone 40 is fed with outside fresh air by taking means 41 and means 42 are provided for expelling the duly taken air to the outside.

According to one implementation of the present invention, a valve 43 is provided on the taking means 41 and said zone 40 includes an inlet 44, linked to the outlet 9 of the switching vale 7 by a duct 45.

In cruising flight phase or in a flight phase close to cruising, the valves 7 and 43 are in their position represented by broken lines, that is, the valve 43 is closed and the valve 7 connects the inlet 6 with the zone 40. The result of this is then that the latter is ventilated, and partially pressurized, by the conditioned air leaving the cabin 2, no fresh air penetrating into said zone because of the blocking of the taking means 41 by the valve 43. Thus, the energy of the conditioned air passing through the cabin 2 is used to ventilate and partially pressurize the zone 40. Furthermore, since no fresh air is taken by the means 41, the harnessing drag normally generated by the latter is eliminated.

On the other hand, in the other usage phases of the aircraft, the valves 7 and 43 are in their positions represented by solid lines, that is, the valve 43 is open and the valve 7 connects the inlet 6 with the duct 10. The zone 40 is then ventilated only by the taking means 41.

From the above, it can therefore be seen that, in cruising flight mode or in a flight phase close to cruising, at least part of the energy generated by the release of the conditioning air from the cabin 2 escaping to the outside of the aircraft is recovered inside the zone 40, which is symbolized by the letter R.

The invention claimed is

1. An aircraft including:
   an air conditioning system feeding conditioned air to at least one zone of said aircraft via distribution means, a zone in which the conditioned air can escape outside said aircraft through an exhaust duct;
   means able to recover, when said aircraft is flying at altitude, the energy of the release of said conditioned air when the latter passes from said conditioned zone to outside the aircraft;
   a switching valve, the sole inlet of which is positioned in said conditioned zone and of which a first and a second outlets are respectively linked to said exhaust duct and to said energy recovery means, said switching valve being:
      in its position linking its inlet to said energy recovery means when said aircraft is in cruising flight phase or in a flight phase close to cruising, and
      in its position linking its inlet to said exhaust duct, in all other possible situations of said aircraft,
   an auxiliary air conditioning unit partly fed with energy by said energy recovery means and able to take fresh air from outside said aircraft and generate conditioned air from said fresh air; and
   switching means making it possible to feed said distribution means:
      with conditioned air originating from said auxiliary conditioning unit, when said aircraft is in cruising phase or in a flight phase close to cruising, and
      with conditioned air originating from said air conditioning system in all other possible situations of said aircraft.

2. The aircraft as claimed in claim 1, provided with at least one turboshaft engine and an air conditioning system comprising:
   means of taking hot air from said turboshaft engine;
   means of converting said duly taken hot air into conditioned air; and
   means making it possible to interrupt the taking of hot air from the turboshaft engine by said hot air taking means when said conditioned air distribution means are fed by said auxiliary unit.

3. An aircraft comprising:
   an air conditioning system feeding conditioned air to at least one zone of said aircraft, a zone in which the conditioned air can escape outside said aircraft through an exhaust duct;
   means able to recover, when said aircraft is flying at altitude, the energy from the release of said conditioned air when the latter passes from said conditioned zone to the outside of the aircraft;
   a switching valve, the sole inlet of which is positioned in said conditioned zone and of which a first and a second outlets are respectively linked to said exhaust duct and to said energy recovery means, said switching valve being:
      in its position linking its inlet to said energy recovery means when said aircraft is in cruising flight phase or in a flight phase close to cruising; and
      in its position linking its inlet to said exhaust duct in all other possible situations of said aircraft; and
   at least one ventilated zone fed with ventilation air by means of taking fresh air from outside said aircraft and being able to let the ventilation air escape outside the aircraft,
in which:
   said energy recovery means comprise a link between said second outlet of said switching valve and said ventilated zone;
   control means make it possible to interrupt the taking of fresh air by said fresh air taking means; and
   said ventilated zone is fed:
      with conditioned air via said link when said aircraft is in cruising phase or in a flight phase close to cruising, the taking of fresh air then being interrupted by said control means; and
      with fresh air originating from said taking means, in all other possible situations of said aircraft, said link then being interrupted by said switching valve.

* * * * *